(12) United States Patent
Shimizu et al.

(10) Patent No.: US 9,344,309 B2
(45) Date of Patent: May 17, 2016

(54) DECISION CIRCUIT, RECEIVER DEVICE, AND PROCESSOR

(71) Applicant: FUJITSU LIMITED, Kawasaki-shi, Kanagawa (JP)

(72) Inventors: Takashi Shimizu, Kawasaki (JP); Jun Matsui, Kawasaki (JP); Tsuyoshi Yamamoto, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 66 days.

(21) Appl. No.: 14/219,327

(22) Filed: Mar. 19, 2014

(65) Prior Publication Data
US 2014/0369445 A1    Dec. 18, 2014

(30) Foreign Application Priority Data

Jun. 12, 2013    (JP) ................................ 2013-123765

(51) Int. Cl.
| | |
|---|---|
| H03D 1/24 | (2006.01) |
| H03M 13/03 | (2006.01) |
| H04L 27/06 | (2006.01) |
| H04B 7/04 | (2006.01) |

(52) U.S. Cl.
CPC .............. H04L 27/06 (2013.01); H04B 7/0447 (2013.01)

(58) Field of Classification Search
CPC ..... H04L 27/06; H04L 27/00; H04L 27/2649; H04L 5/003; H04L 27/38; H04L 1/0057; H04L 12/40
USPC .......................................... 375/321; 714/786
See application file for complete search history.

(56) References Cited

U.S. PATENT DOCUMENTS

| | | | | |
|---|---|---|---|---|
| 4,237,496 A | * | 12/1980 | De Niet ............. | G11B 20/1411 360/40 |
| 5,249,202 A | * | 9/1993 | Hillum .................... | H04B 1/68 375/321 |
| 6,192,187 B1 | * | 2/2001 | Kinghorn ....................... | 386/245 |
| 7,913,152 B2 | * | 3/2011 | Jeong .................... | H03M 13/27 375/270 |
| 8,270,517 B2 | * | 9/2012 | van Zelst ............. | H04B 7/0447 375/267 |
| 2001/0004383 A1 | * | 6/2001 | Nordstrom ............... | H04B 1/62 375/222 |
| 2006/0018394 A1 | * | 1/2006 | van Zelst ................. | H04B 7/04 375/260 |
| 2007/0030891 A1 | * | 2/2007 | Franz ............................ | 375/233 |
| 2007/0168842 A1 | * | 7/2007 | Jeong .................... | H03M 13/27 714/786 |
| 2008/0205568 A1 | * | 8/2008 | Oyama ......................... | 375/365 |

(Continued)

FOREIGN PATENT DOCUMENTS

| | | |
|---|---|---|
| JP | 06-326609 | 11/1994 |
| JP | 11-220506 | 8/1999 |

(Continued)

*Primary Examiner* — Chieh M Fan
*Assistant Examiner* — Sarah Hassan
(74) *Attorney, Agent, or Firm* — Staas & Halsey LLP

(57) ABSTRACT

A decision circuit includes: a first decision block to distinguish a first bit of bits using an amplitude of an analog signal as a discrimination point, the analog signal being an amplitude shift keyed signal; a superposition block to acquire an absolute value of a difference of the analog signal in respect to an amplitude center value of the analog signal by superposing divided analog signals; an inversion block to control inverting of the signal based on a first distinction result of the first decision block; a second decision block to distinguish a second bit of the bits based on an amplitude of an output signal from the inversion block and the discrimination point; and an output buffer to output the first distinction result and a second distinction result of the second decision block in synchronization with a clock.

15 Claims, 7 Drawing Sheets

(56) References Cited

U.S. PATENT DOCUMENTS

| | | |
|---|---|---|
| 2009/0323852 A1 | 12/2009 | Ikushima et al. |
| 2010/0290545 A1* | 11/2010 | Kim .................. H04L 5/0007 375/260 |
| 2012/0183100 A1* | 7/2012 | Luzzi et al. ................. 375/320 |

FOREIGN PATENT DOCUMENTS

| | | |
|---|---|---|
| JP | 2001-094424 | 4/2001 |
| JP | 2006-270726 | 10/2006 |
| JP | 2007-194967 | 8/2007 |
| JP | 2008-300971 | 12/2008 |

* cited by examiner

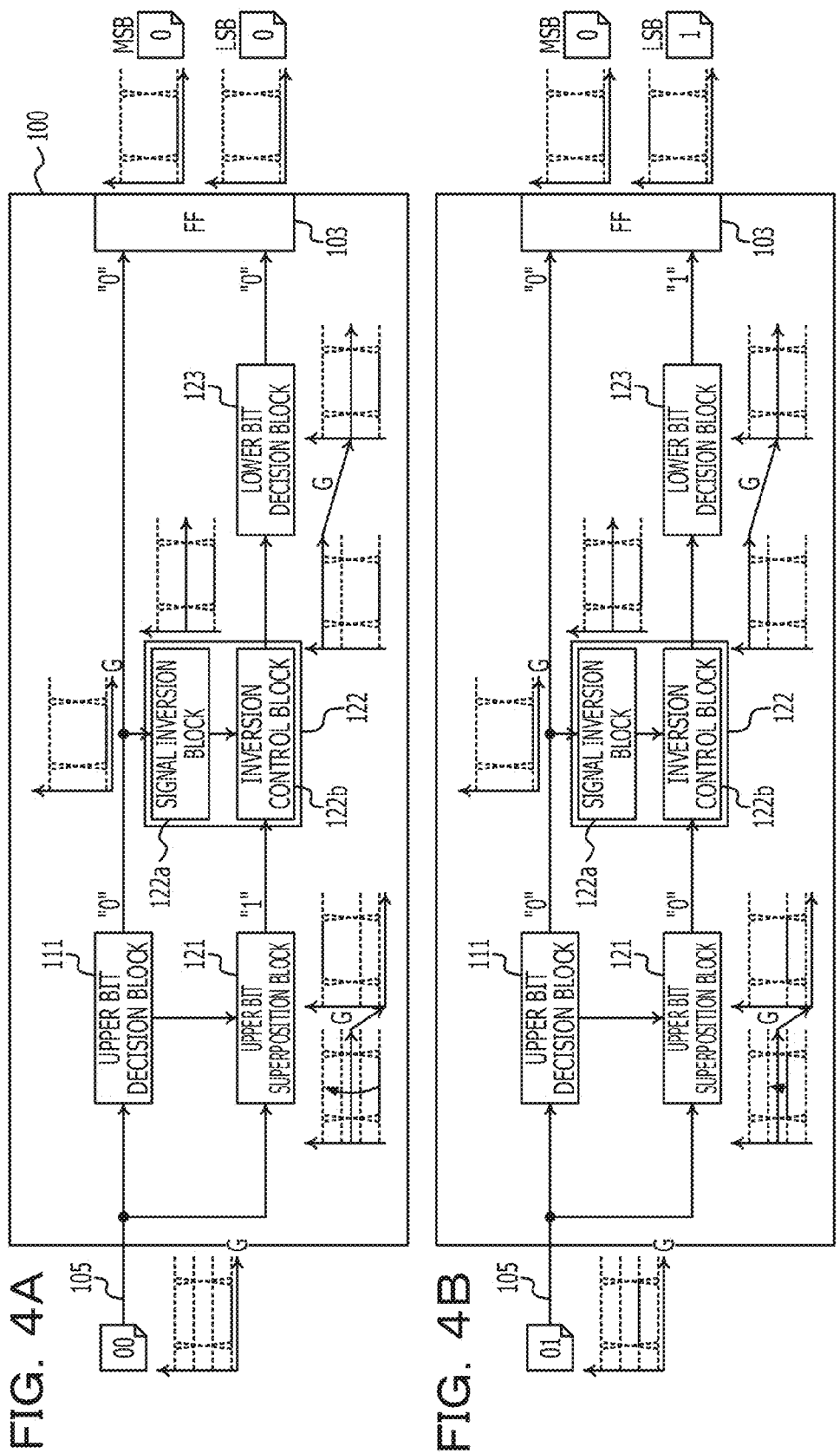

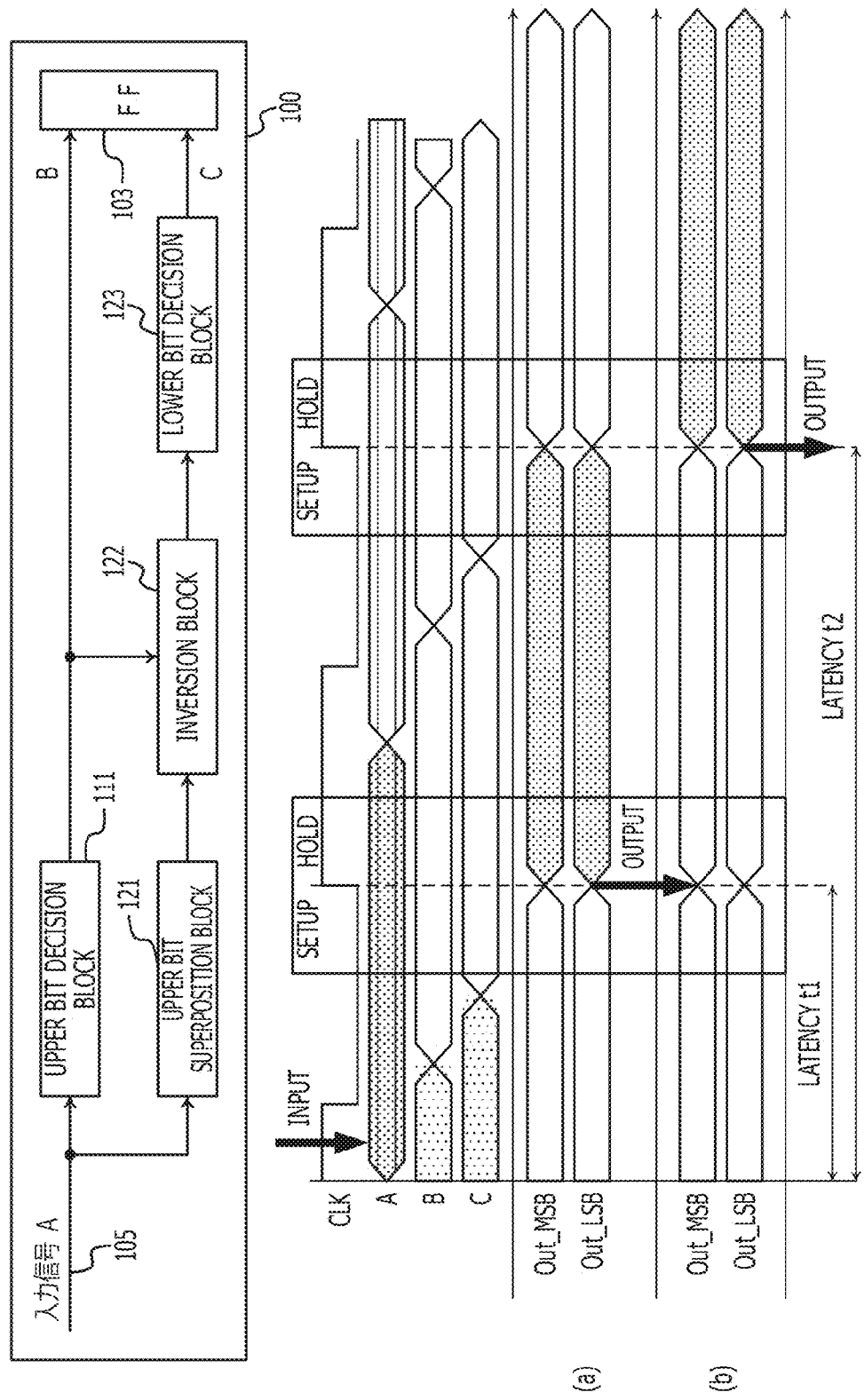

US 9,344,309 B2

DECISION CIRCUIT, RECEIVER DEVICE, AND PROCESSOR

CROSS-REFERENCE TO RELATED APPLICATION

This application is based upon and claims the benefit of priority from the prior Japanese Patent Application No. 2013-123765 filed on Jun. 12, 2013, the entire contents of which are incorporated herein by reference.

FIELD

The embodiments discussed herein are related to decision circuits, receiver devices, and processors.

BACKGROUND

In information processing apparatuses including central processing units (CPUs), processing capacity increases in a manner that follows Moore's law. However, the number of pins in a CPU package does not increase so much because of size constraint. Thus, the amount of data communication per pin in an interconnect increases. To cope with this increase in the amount of data communication, efforts are being made to speed up the baud rate.

Related arts are disclosed in Japanese Laid-open Patent Publication Nos. 2001-94424, 2006-270726, and 06-326609.

SUMMARY

According to an aspect of the embodiments, a decision circuit includes: a first decision block configured to distinguish a value of a first bit of a plurality of bits by using an amplitude of an analog signal as a discrimination point, the analog signal being an amplitude shift keyed signal in which a demodulation pattern of the plurality of bits is set for each one of a plurality of amplitudes; a superposition block configured to acquire a signal of an absolute value of a difference of the analog signal in respect to an amplitude center value of the analog signal by superposing divided analog signals which is obtained by dividing the analog signal; an inversion block configured to control inverting of the signal based on a first distinction result of the first decision block; a second decision block configured to distinguish a value of a second bit of the plurality of bits based on an amplitude of an output signal from the inversion block and the discrimination point; and an output buffer configured to output the first distinction result and a second distinction result of the second decision block in synchronization with a clock.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4A and FIG. 4B illustrate an example of an operation of an ASK discrimination and decision circuit;
FIG. 5A and FIG. 5B illustrate an example of an operation of an ASK discrimination and decision circuit;
FIG. 6 illustrates an example of a timing chart of an ASK discrimination and decision circuit.

DESCRIPTION OF EMBODIMENTS

In multilevel modulations where plural pieces of data are superposed at each symbol, signals (data) are transmitted as signals modulated in phase, amplitude, or the like, and retrieved as digital signals at a receiver side. Of multilevel modulation schemes, a scheme where intensity is represented with a plurality of levels is referred to as an amplitude shift keying (ASK) modulation.

For example, when four-level ASK signals are in use, the signal amplitude is separated into four stages to transmit and receive two-bit signals. With the four-level ASK signal, the signal amplitude is distinguished by use of three discrimination points, and the discriminated signal is demodulated to an original two-level digital signal prior to an modulation and outputted. The demodulation is performed by using an analog-to-digital converter (ADC) or the like. There are plural types of ADC, and a flash type ADC operates at high speed.

Figure 1:
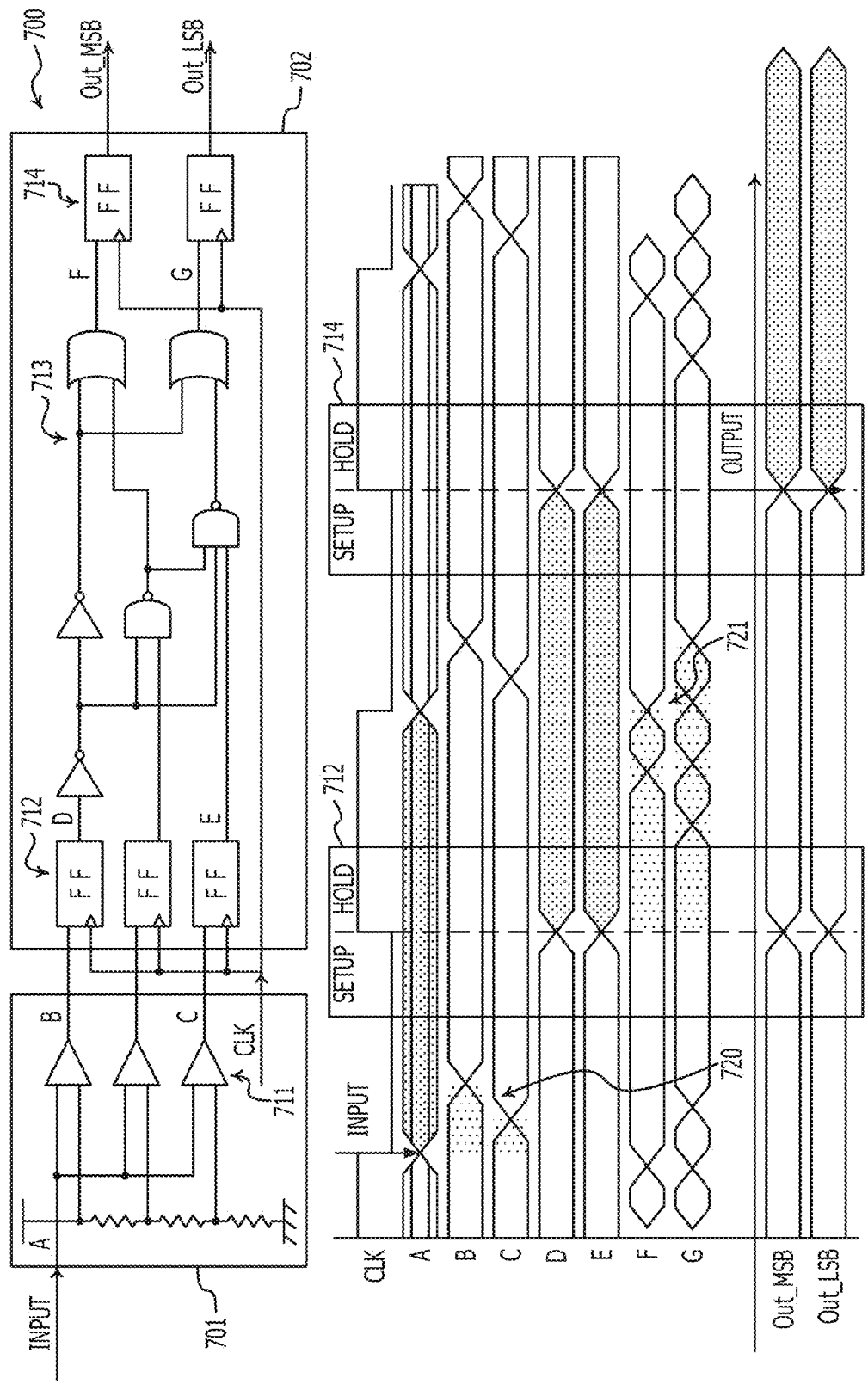
FIG. 1 illustrates an example of a flash type ADC.

FIG. 1 illustrates an example of a flash type ADC. An ADC 700 includes an analog circuit 701 and a digital circuit 702. The analog circuit 701 includes comparators 711 to distinguish the signal amplitude of an input analog signal. The discrimination points are set at respective limits of the signal amplitude of analog signal. The digital circuit 702 may be a decoder to demodulate outputs of the comparators 711 to a two-bit digital signal.

The analog circuit 701 of the ADC 700 sets different reference voltages, the number of which is identical to that of the discrimination points. The reference voltages are each input to the corresponding comparators 711, the number of which is identical to that of the discrimination points. In the case where the analog signals have four different amplitudes, the discrimination and decision are performed by use of the three comparators 711 to which the three discrimination points are set. The input signal is input to the respective comparators 711, and the plural comparators 711 determine whether or not the amplitude of the input signal exceed their respective reference voltages all at once. The comparator 711 is asserted when the signal input to that comparator 711 exceeds the reference voltage, and the comparator 711 is de-asserted when the signal input to that comparator 711 does not exceed the reference voltage.

The digital circuit (decoder) 702 demodulates outputs of the three comparators 711 of the analog circuit 701 to a two-bit digital signal. Flip-flops (FFs) 712 are arranged at an input stage of the decoder 702 to deal with variations in delay or wiring length among the comparators 711 so as to generate signals in synchronization with a clock. A circuit for converting the outputs of the FFs 712 to original information, for example, a 3-to-2 priority encoder 713 is disposed in the decoder 702. This circuit has three inputs to which different priorities are assigned and two outputs corresponding to an upper bit and a lower bit. The outputs of the FFs 712 at the previous stage are coupled to the inputs of the priority encoder 713 in such a way that the FF 712 coupled to the comparator 711 having the lower reference voltage is coupled to the input of the priority encoder 713 having the lower priority in ascending order.

The outputs of the priority encoder 713 are again synchronized by FFs 714. The four-level ASK signal is demodulated to a decoded two-bit signal, and the outputs synchronized with clock timing are obtained with the FFs 712 and 714.

In the ASK signal demodulation, complicated circuits are used for transmission and reception. Thus, the ASK signal demodulation may not be used for interconnects in view of latency. For example, when an ASK signal is demodulated with the ADC 700, the latency may be divided into latency of the analog circuit 701 such as the comparators 711 or the like and latency of the digital circuit 702 including the decoder. The latency may be a time period from an issue of communication request to an arrival of data at a receiver.

In fields of multilevel modulation applications such as backbone communications and wireless communications, the communication bandwidth is emphasized. On the other hand, in fields of interconnects, the latency is emphasized due to cache snooping or the like. Thus, there is a growing demand for latency reduction.

As illustrated in FIG. 1, when the ADC 700 is used in the ASK signal demodulation, the FFs 712 are arranged at the input stage of the digital circuit (decoder) 702 to resolve variations 720 in delay that occur due to the response times of the comparators 711, circuit wiring, and the like. The FFs 714 are arranged so as to resolve variations 721 in delay at the decoder 702. The decoder 702 is provided with two stages of the FFs 712 and 714. Thus, data are output at the second clock cycle and after from the input timing of signal. For example, the latency of an interconnect having a baud rate of 25 GHz is 40 psec.

If the FFs 712 at the input stage of the decoder 702 were removed in order to reduce the latency, the delays of the comparators 711 and the delay of the decoder 702 may be added up and result a data error based on a setup time error at the FFs 714.

Figure 2:
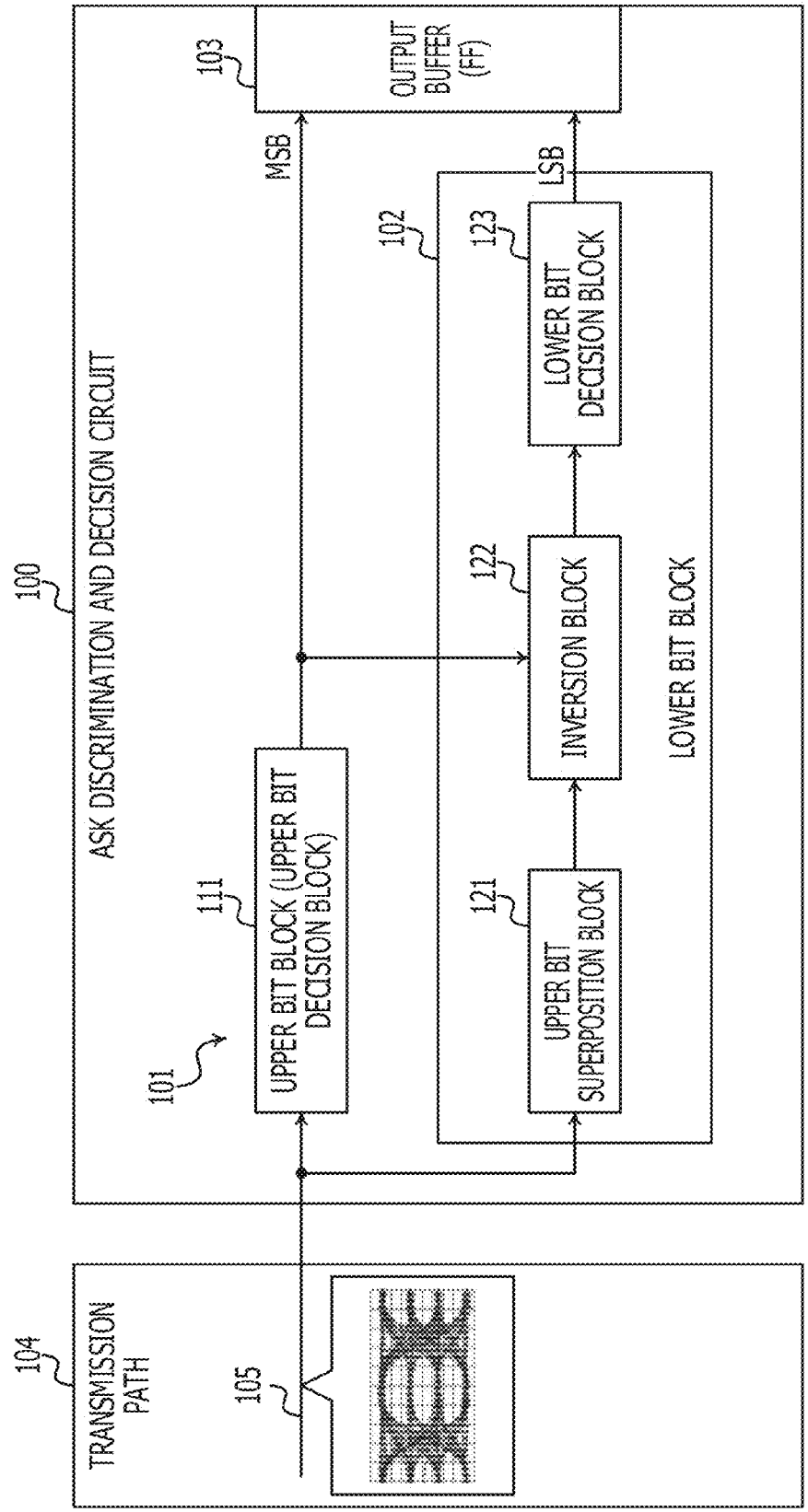
FIG. 2 illustrates an example of an ASK discrimination and decision circuit.

FIG. 2 illustrates an example of an ASK discrimination and decision circuit.

An input signal 105 is input to an ASK discrimination and decision circuit 100 via a transmission path 104. The input signal 105 may be, for example, a multilevel-modulated ASK signal. When the input signal 105 is a four-level ASK signal, four patterns are arbitrary defined and assigned to the values of signal amplitude for use in between a transmitter and a receiver. For example, the four patterns may be "00", "01", "11" and "10" based on combinations of two bits of the upper bit and the lower bit, and assigned to the values of signal amplitude in ascending order.

The ASK discrimination and decision circuit 100 includes an upper bit block 101, a lower bit block 102, and an output buffer 103. The input signal 105 is divided and input to the upper bit block 101 and the lower bit block 102. The upper bit block 101 and the lower bit block 102 may be analog circuits. The output buffer 103 may be a digital circuit that operates in synchronization with a clock.

The upper bit block 101 includes an upper bit decision block 111 to determine the upper bit of the input signal 105. The lower bit block 102 determines the upper bit of the input signal 105, and includes an upper bit superposition block 121, an inversion block 122, and a lower bit decision block 123. The output buffer 103 includes flip-flops (FFs), and retains and outputs determined upper bit data output from the upper bit decision block 111 and determined lower bit data output from the lower bit decision block 123.

The ASK discrimination and decision circuit 100 includes a single stage of FF 103, and distinguishes and outputs the input signal 105 within a single clock cycle. As a result, the latency may be decreased.

The upper bit decision block 111 of the upper bit block 101 receives the input signal 105 that is divided, and distinguishes and determines the upper bit of the input signal 105. A determined upper bit MSB is output to the output buffer 103 and the inversion block 122.

"11" and "10" corresponding to larger amplitudes of the input signal 105 have the upper bit of 1 whereas "01" and "00" corresponding to smaller amplitudes (ground level) have the upper bit of 0. Thus, the upper bit decision block 111 sets one discrimination point at an amplitude center between "10" and "01" of the input signal 105, and obtains the MSB by distinguishing and determining the value of the upper bit of the input signal 105.

The upper bit superposition block 121 of the upper bit block 102 receives the input signal 105 that is divided. Superposing the input signal 105 converts a four-level signal waveform to a two-level signal waveform, and a converted signal is output to the inversion block 122.

The inversion block 122 receives the output (control signal) from the upper bit superposition block 121 and the output (input signal) from the upper bit decision block 111. The inversion block 122 performs inversion or non-inversion of the output from the upper bit superposition block 121 based on the output from the upper bit decision block 111, and outputs an inverted or non-inverted signal to the lower bit decision block 123.

The lower bit decision block 123 determines the lower bit LSB based on the output of the inversion block 122, and outputs a determined result to the output buffer 103. The lower bit decision block 123 sets one discrimination point at the amplitude center of the input signal 105, as is the case with the upper bit decision block 111, and obtains the lower bit LSB by distinguishing and determining the value of the lower bit of the input signal 105.

The output buffer (FF) 103 outputs the upper bit MSB output from the upper bit decision block 111 and the lower bit LSB output from the lower bit decision block 123 in synchronization with a clock.

The ASK discrimination and decision circuit 100 has input and output functions substantially the same as or similar to the ADC by demodulating and outputting an input four-level ASK signal, and synchronizing and outputting the upper bit MSB and the lower bit LSB.

For example, as illustrated in FIG. 2, the upper bit decision block 111 and the lower bit decision block 123 are each provided with the single discrimination point at the amplitude center of the input signal 105, and stably distinguish and determine at least one of the upper bit and the lower bit that is separated from the center. For example, the amplitudes of the input signal 105 may be measured in advance, and the discrimination point may be set at a center of measured amplitudes.

Even for a multilevel input signal 105, a plurality of discrimination points, for example, three discrimination points may not be used. This facilitates level setting of the discrimination point and enables a stable discrimination and decision.

Figure 3:
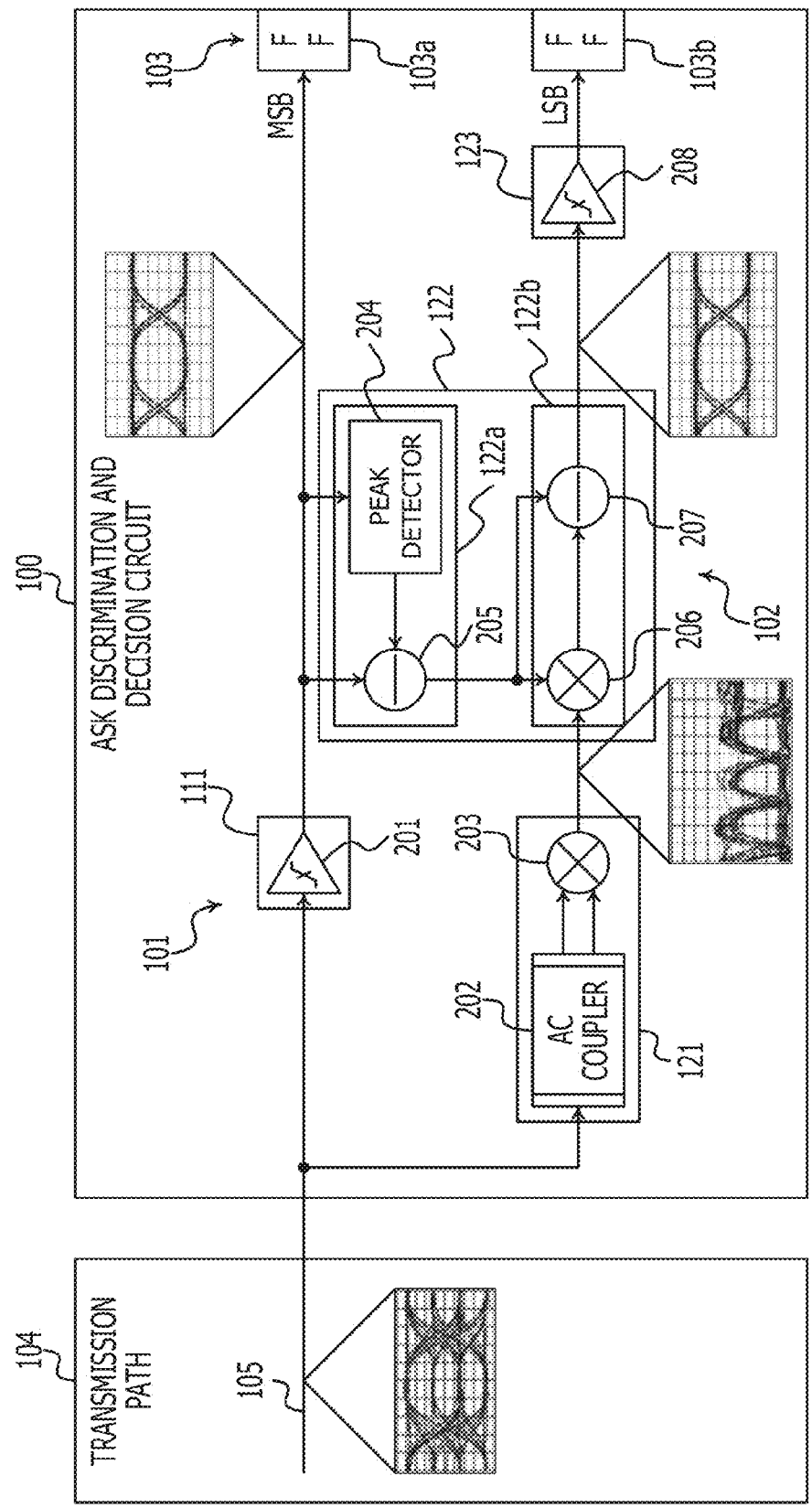
FIG. 3 illustrates an example of an ASK discrimination and decision circuit.

FIG. 3 illustrates an example of the ASK discrimination and decision circuit. In FIG. 3, functions illustrated in FIG. 2 are implemented with analog circuits.

In the ASK discrimination and decision circuit 100, an upper bit FF 103a and a lower bit FF 103b are used as an output buffer 103. Functions other than that of the FF 103 (103a, 103b) may be implemented with high-speed analog circuits, and no operation may not be performed in synchronization with a clock. Accordingly, the signal may be transmitted from an input to an output of the FF 103 (103a, 103b) within one clock cycle, and a distinguished output may be obtained at the timing of one clock cycle.

As illustrated in FIG. 3, a comparing device 201 such as a limiting amplifier, a comparator, or the like is used as the upper bit decision block 111. The limiting amplifier outputs an input signal 105 that exceeds a center discrimination point at a certain voltage. A reference voltage for the discrimination point is input to an input terminal of the comparator in addition to the input signal 105. A voltage that corresponds to the amplitude center of the input signal 105 may be input from an outside as the reference voltage. For example, the reference voltage may be set based on signal amplitudes detected with a peak detection circuit (peak detector) or the like.

The comparing device 201 outputs a HIGH (true) voltage that matches a specification of the FF 103 in the following stage when the signal voltage exceeds the reference voltage. For example, a voltage of 5 V is output in a TTL. When the signal voltage falls below the reference voltage or is not larger than the reference voltage, a LOW (0 V) voltage is output.

The upper bit superposition block 121 may include, for example, an AC coupler 202 and a multiplier 203. In the AC coupler 202, a high frequency capacitor may be coupled to the signal in series. When an average value of the input signal 105 is not zero, AC coupling with the AC coupler 202 enables to output a signal, the level of which is symmetric about a ground level in positive and negative sides.

The multiplier 203 converts the output of the AC coupler 202 from the four-level signal to the two-level signal. Therefore, the output of the AC coupler 202 is divided into two, and are both input to the multiplier 203 substantially at the same time. The multiplier 203 calculates a square of parallel inputs. The multiplier 203 may be a four-quadrant multiplier capable of calculating all patterns of two inputs at both positive and negative domains, and may be, for example, a multiplier in which a plurality of the Gilbert cells are arranged therein. A general-purpose multiplier may also be used. For example, a multiplier disclosed in Japanese Laid-open Patent Publication No. 11-220506, an "AD834" 500 MHz four-quadrant multiplier of Analog Devices, Inc., or the like may also be used.

For example, at the AC coupler 202, the input signal 105 is converted in such a way that signals of 0 and 1 are converted to signals of '-1' and '1', respectively. The signal of the AC coupler 202 are divided into two and input to the multiplier 203. Thus, signals of "11" and "00" in the input signal 105 of ASK may yield larger outputs whereas signals of "10" and "01" may yield smaller outputs.

The inversion block 122 may include, for example, a signal inversion block 122a and an inversion control block 122b. In the signal inversion block 122a, a peak detector 204 and a subtractor (first subtractor) 205 are used. The peak detector 204 detects a peak value of the output from the comparing device 201 for the upper bit decision, and outputs to the subtractor 205. For example, when a HIGH (true) of TTL or the like is a positive value or, for example, 5 V and a LOW (false) is 0 V, the subtractor 205 shifts the signal level by a half or 2.5 V. For example, HIGH is converted to '1' at 2.5 V, and LOW is converted to '-1' at -2.5 V. This converted signal (control signal) is output.

In the inversion control block 122b, a multiplier 206 and a subtractor 207 are used. A four-quadrant multiplier may be used for the multiplier 206, as is the case with the multiplier 203. The multiplier 206 multiplies a signal output from the multiplier 203 of the upper bit superposition block 121 by the control signal output from the subtractor 205. Thus, the level may be inverted when the control signal is LOW.

For example, in the case where the output of the upper bit superposition block 121 (multiplier 203) is a 5-volt TTL output, HIGH is 5 V and LOW is 0 V when no inversion is performed. HIGH is 0 V and LOW is -5 V when the inversion is performed. However, in this case, an input condition for the FF 103b in the following stage may not be satisfied. Thus, the multiplier 206 may be coupled to an AC coupler or the subtractor 207 that subtracts the control signal after the level shifting from the inverted signal. Having the subtractor 207 in between the multiplier 206 and the FF 103b may allow a HIGH to be an output of '1' at 2.5 V and a LOW to be an output of '-1' at -2.5 V at both the inversion and non-inversion cases.

The output of the inversion block 122 is input to the lower bit decision block 123. The lower bit decision block 123 determines whether the value of the input signal is positive or negative. The lower bit decision block 123 uses, as is the case with the upper bit decision block 111, a comparing device 208 such as a comparator, a limiting amplifier, or the like. The reference voltage for the comparing device 208 may be at the ground level.

The two FFs 103a and 103b included in the output buffer 103 each store one bit information. The two FFs 103a and 103b are coupled to the upper bit decision block 111 and the lower bit decision block 123, and receive the output signals therefrom. The FFs 103a and 103b may be storage media that strobe data based on a leading or trailing edge of an input clock, and may be a D-FF or a JK-FF. The clock input to the FFs 103a and 103b may be a clock whose frequency substantially coincides with the baud rate of a transmission signal or, for example, the input signal 105. The clock may be input to the FFs 103a and 103b at substantially the same phase. Accordingly, outputs from the FFs 103a and 103b may be output substantially at the same timing.

Figure 5A:
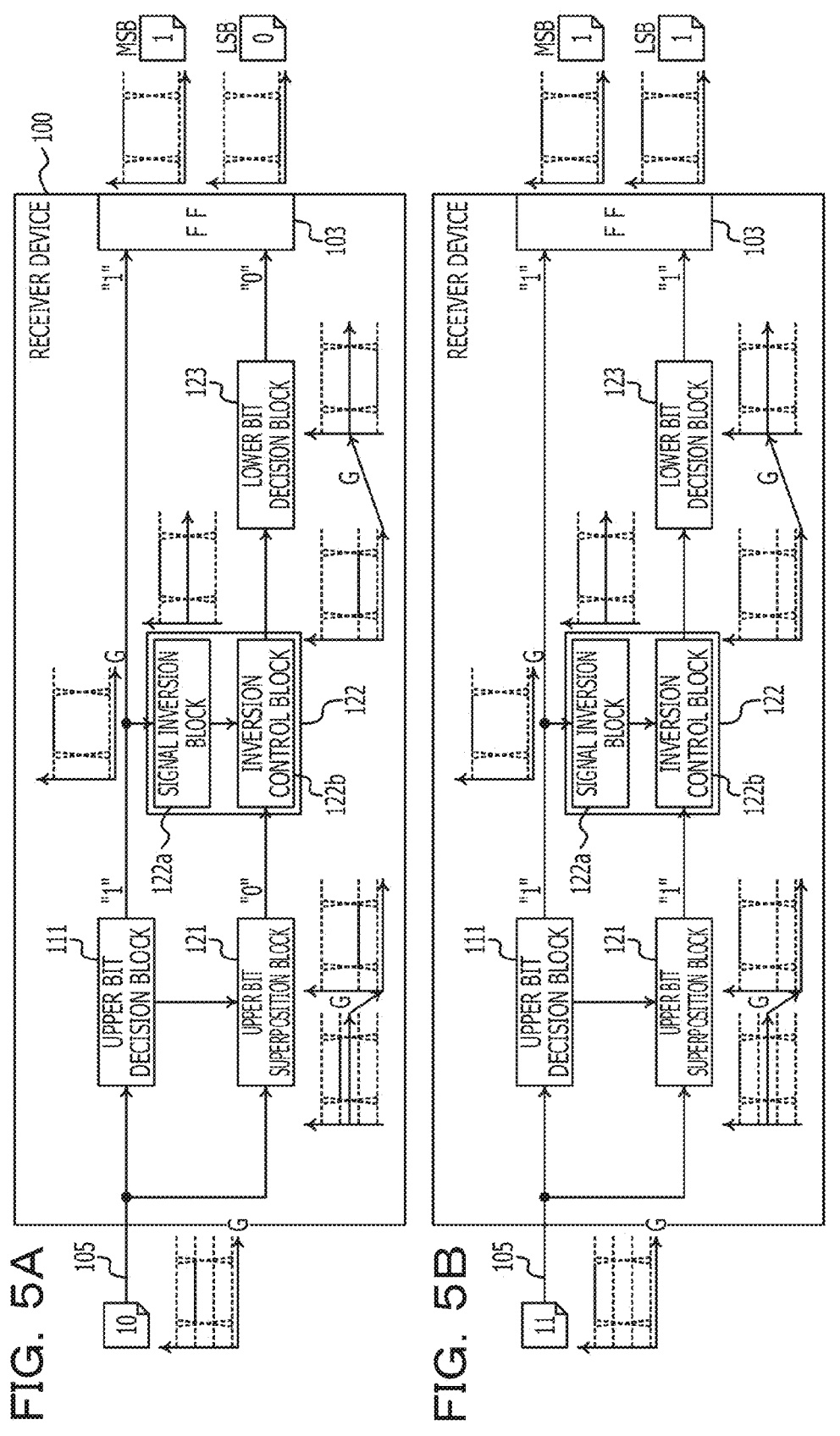

FIG. 4A and FIG. 4B illustrate an example of an operation of an ASK discrimination and decision circuit. FIG. 5A and FIG. 5B illustrate an example of an operation of an ASK discrimination and decision circuit. FIG. 4A and FIG. 4B, and FIG. 5A and FIG. 5B illustrate discrimination-and-decision operations of the ASK discrimination and decision circuit 100 with four-level AKS signals.

In FIG. 4A, "00" is input as the input signal 105. The input signal 105 corresponding to "00" is positioned close to the ground (G) level that is the lowest stage of four-staged amplitude. The upper bit decision block 111 determines the input with the amplitude center, and outputs "0", a determination result of the upper bit, to the FF 103.

The upper bit superposition block 121 adjusts the ground level G to the center of the amplitude of the input signal 105, and calculates a square of that signal. Thus, the upper bit superposition block 121 converts "10" and "01" to substantially the same level, and "00" and "11" to substantially the same level. "10" and "01" are converted to smaller amplitudes after being squared since "10" and "01" are closer to the ground level G whereas "00" and "11" are converted to larger amplitudes after being squared since "00" and "10" are farther away from the ground level G.

As illustrated in FIG. 4A, in the upper bit superposition block 121, the upper bit "0" is converted to a larger amplitude since the position of corresponding amplitude is far away from the ground level G. This larger amplitude is determined as '1', and the upper bit "0" is folded back about the ground level G to perform the inversion, and output as the lower bit "1". In this case, the lower bit "1" of the input signal 105 output from the upper bit superposition block 121 is inverted with respect to an expected value "0". The output of the upper bit superposition block 121 is input to the inversion block 122.

The signal inversion block 122a outputs the value of the upper bit "0/1" to the inversion control block 122b as the control signal. The inversion control block 122b outputs the input signal from the upper bit superposition block 121 without any change (non-inversion) when the control signal is "1", and inverts the input signal and outputs an inverted signal when the control signal is "0".

In FIG. 4A, the value of the control signal is shifted in level. For example, "0" is converted to "−1". Subsequently, the value of the control signal is multiplied by the input signal. Thus, the output "1" of the inverted lower bit in "00" indicated by the input signal 105 coincides with an expected value "0". In the inversion control block 122b, irrespective of the inversion (and non-inversion) of the output, the signal is shifted in level to adjust the ground level G. For example, when the signal is inverted, the signal expressed with 0 and −1 is shifted to the signal expressed with 1 and 0 so as to match the level with the case where no inversion is performed.

The lower bit decision block 123 determines the signal with the amplitude center, as is the case with the upper bit decision block 111, and outputs "0", a determination result of the lower bit, to the FF 103.

In FIG. 4B, "01" is input as the input signal 105. The input signal 105 corresponding to "01" may have the amplitude of a second lowest stage of the four-staged amplitude. The upper bit decision block 111 performs determination with the amplitude center, and outputs "0", a determination result of the upper bit, to the FF 103.

The upper bit superposition block 121 adjusts the ground level G to the center of amplitude of the input signal 105, and calculates a square of an adjusted signal. Squaring at the upper bit superposition block 121 converts the signal "01" to a smaller amplitude signal because the signal "01" is close to the ground level G.

In FIG. 4B, the upper bit superposition block 121 determines this smaller amplitude as '0', and outputs the upper bit "0" as the lower bit "0". In this case, the lower bit "0" of the input signal 105 output from the upper bit superposition block 121 is inverted with respect to an expected value "1". The output of the upper bit superposition block 121 is input to the inversion block 122.

The signal inversion block 122a outputs the value of the upper bit "0/1" to the inversion control block 122b as the control signal. The inversion control block 122b inverts the input signal and outputs an inverted signal when the control signal is "0".

In FIG. 4B, the value of the control signal is shifted in level. For example, "0" is converted to "−1". Subsequently, the value of a level-shifted control signal is multiplied by the input signal. Thus, the output "0" of the inverted lower bit in "01" of the input signal 105 coincides with an expected value "1". In the inversion control block 122b, irrespective of the inversion (and non-inversion) of the output, the signal is shifted in level to adjust the ground level G. For example, when the signal is inverted, the signal expressed with 0 and −1 is shifted to the signal expressed with 1 and 0, respectively, so as to match the level with the case where no inversion is performed.

The lower bit decision block 123 determines the signal with the amplitude center, as is the case with the upper bit decision block 111, and outputs "1", a determination result of the lower bit, to the FF 103.

In FIG. 5A, "10" is input as the input signal 105. The input signal 105 corresponding to "10" may have the amplitude of a third lowest stage of the four-staged amplitude. The upper bit decision block 111 performs determination with the amplitude center, and outputs "1", a determination result of the upper bit, to the FF 103.

The upper bit superposition block 121 adjusts the ground level G to the center of amplitude of the input signal 105, and calculates a square of a signal thus adjusted. Squaring at the upper bit superposition block 121 converts the signal "10" to a smaller amplitude signal because the signal "10" is close to the ground level G.

In FIG. 5A, the upper bit superposition block 121 determines this smaller amplitude as '0', and outputs the upper bit "0" as the lower bit "0". In this case, the lower bit "0" of the input signal 105 output from the upper bit superposition block 121 coincides with an expected value "0". The output of the upper bit superposition block 121 is input to the inversion block 122.

The signal inversion block 122a outputs the value of the upper bit "0/1" to the inversion control block 122b as the control signal. The inversion control block 122b does not invert the input signal and outputs the input signal without any change when the control signal is "1".

The inversion control block 122b shifts the signal in level to adjust the ground level G, irrespective of the inversion (and non-inversion) of the output.

The lower bit decision block 123 determines the signal with the amplitude center, as is the case with the upper bit decision block 111, and outputs "0", a determination result of the lower bit, to the FF 103.

In FIG. 5B, "11" is input as the input signal 105. The input signal 105 corresponding to "11" may have the amplitude of a highest stage of the four-staged amplitude. The upper bit decision block 111 performs determination by the amplitude center, and outputs "1", a determination result of the upper bit, to the FF 103.

The upper bit superposition block 121 adjusts the ground level G to the center of amplitude of the input signal 105, and calculates a square of a signal thus adjusted. For example, squaring at the upper bit superposition block 121 converts the signal "11" to a larger amplitude signal because the signal "11" is far away from the ground level G.

In FIG. 5B, the upper bit superposition block 121 determines this larger amplitude as '1', and outputs the upper bit "1" as the lower bit "1". In this case, the lower bit "1" of the input signal 105 output from the upper bit superposition block 121 coincides with an expected value "1". The output of the upper bit superposition block 121 is input to the inversion block 122.

The signal inversion block 122a outputs the value of the upper bit "0/1" to the inversion control block 122b as the control signal. The inversion control block 122b does not invert the input signal, and outputs the input signal without any change when the control signal is "1".

The inversion control block 122b shifts the signal in level to adjust the ground level G, irrespective of the inversion (and non-inversion) of the output.

The lower bit decision block 123 determines the signal with the amplitude center, as is the case with the upper bit decision block 111, and outputs "1", a determination result of the lower bit, to the FF 103.

FIG. 6 illustrates an example of a timing chart of an ASK discrimination and decision circuit. In FIG. 6, (a) illustrates a timing chart of the ASK discrimination and decision circuit 100 illustrated in FIG. 2. In FIG. 6, (b) illustrates a timing chart of an ADC that uses two stages of FFs.

As illustrated in FIG. 4A, FIG. 4B, FIG. 5A, and FIG. 5B, in the ASK discrimination and decision circuit 100, the FF 103 outputs the upper bit and the lower bit of a four-level ASK signal in synchronization with a clock. The FF 103 perform a process from an input of the input signal 105 to an output of the discrimination results of the upper bit MSB and the lower bit LSB within latency t1 of one clock cycle.

For example, as illustrated in (b) of FIG. 6, the latency is a period of two clock cycles, t2, from the signal input when the baud rate of input signal is 32 GHz. For example, as illustrated in (a) of FIG. 6, the output is obtained at the first clock cycle in the ASK discrimination and decision circuit 100 illustrated in FIG. 2. Thus, the latency is reduced by one clock cycle period (about 31 psec. in time).

For example, in the ADC 700 illustrated in FIG. 1, circuits disposed between the signal input and the first stage FFs 712 are the comparators 711. For example, the ASK discrimination and decision circuit illustrated in FIG. 2 includes a plurality of analog circuit blocks that may include, for example, the upper bit decision block 111 to the lower bit decision block 123. For example, when the circuit is produced by semiconductor technology with ft of about 200 GHz, a delay time that occurs at the comparator 711 may be 5 to 10 psec. For example, a delay time, which corresponds to a process time in the plurality of analog circuit blocks illustrated in FIG. 2 and the upper bit decision block 111 to the lower bit decision block 123, may be 15 to 20 psec. Accordingly, the latency may increase by about 10 psec in the analog circuit block part, and, for example, the latency may increase by an amount not more than one clock cycle (31 psec). Thus, the total latency may be reduced.

Figure 7:
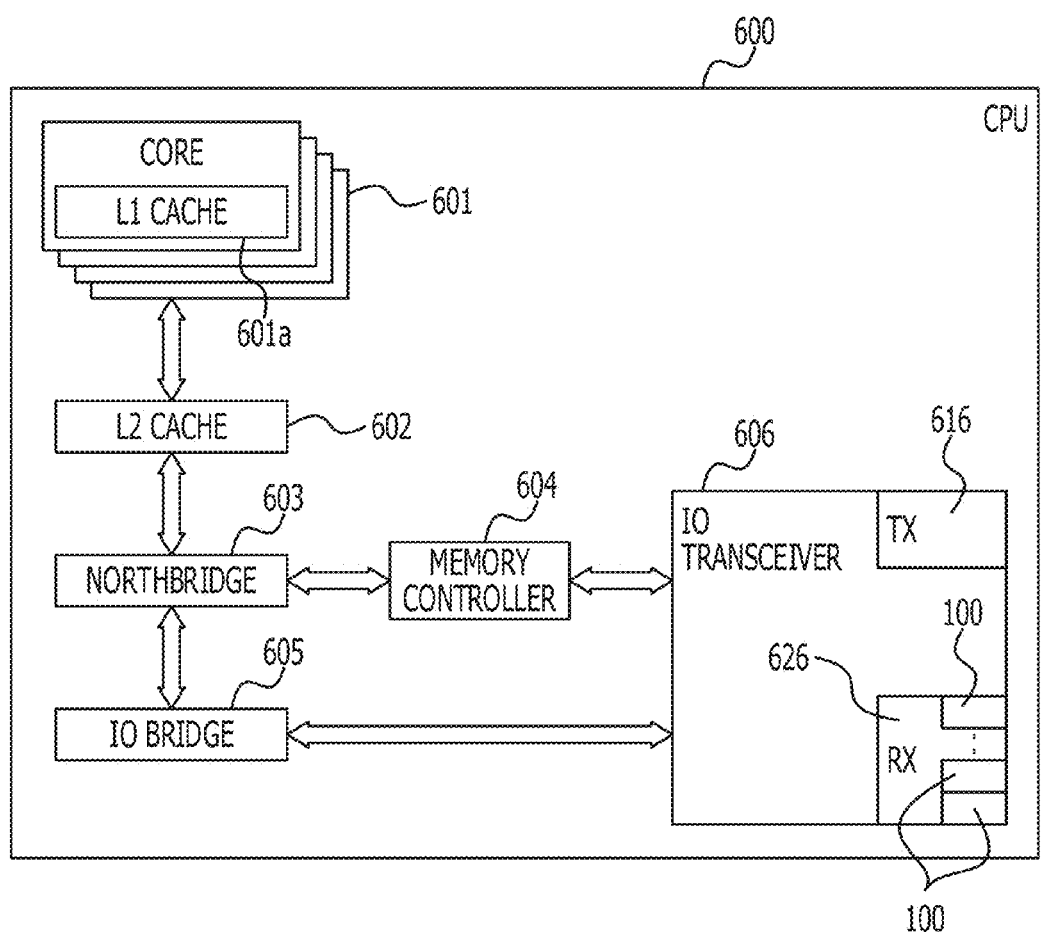
FIG. 7 illustrates an example of an application of an ASK discrimination and decision circuit.

FIG. 7 illustrates an example of an application of a ASK discrimination and decision circuit. For example, the ASK discrimination and decision circuit 100 illustrated in FIG. 2 may be embedded in a receiver device 626. FIG. 6 illustrates a processor (CPU) 600 including the receiver device 626 that includes a function of the ASK discrimination and decision circuit 100. The CPU 600 includes a plurality of cores 601 each of which includes a L1 cache 601a. The cores 601 are coupled to a northbridge 603 through a L2 cache 602. The northbridge 603 is coupled to a memory controller 604 and an IO bridge 605. The memory controller 604 and the IO bridge 605 are coupled to an IO transceiver 606.

The IO transceiver 606 includes a transmitter device 616 and the receiver device 626, and is interconnected with another CPU. The foregoing ASK discrimination and decision circuit 100 may be disposed in part of the receiver device 626. Accordingly, the interconnect utilizing ASK signals is used between the CPU 600 and another CPU.

The foregoing embodiments may be applied to technologies in data communication fields in which speeds thereof are growing. In such technologies, for example, the numbers of pins may be difficult to increase due to size restriction of CPUs or the like, and data may be transmitted and received with low latency.

In the ASK discrimination and decision circuit 100 in which the multilevel-modulated ASK signal is processed with analog circuits, digital signals may be decoded in high speed. The ASK discrimination and decision circuit 100 includes a single stage of the FF 103. Thus, the determination result may be output at the first clock cycle from the input timing, and thus clock latency may be reduced. For example, the total latency may be reduced. The total latency is a sum of the latency for decoding the ASK signal and the latency of the FF 103 that presupposes clock synchronization.

The upper bit block 101 and the lower bit block 102 determine the ASK signal with the single discrimination point set at the amplitude center of the ASK signal. Thus, a plurality of discrimination points is not set in response to plural stages of amplitude, making it possible to perform the determination easily and accurately.

The determination is performed after the lower bit is squared. Thus, signal degradation against noise may be smaller, noise tolerance against input conversion noise, which may be correspond to noise of voltage comparator in an ADC, of the comparing device (limiting amplifier) 201 may be improved, and signal quality may be improved.

For the four-level ASK signal, the four patterns, "00", "01", "11" and "10", may be assigned to possible combinations of two bits, the upper bit and the lower bit, in ascending order of the signal amplitude. In between a transmitter and a receiver, an operation may be performed by defining mapping between the signal amplitudes and the two-bit combinations of the upper bit and the lower bit. Whatever the combinations are used, the foregoing ASK discrimination and decision circuit may determine the ASK signal.

Use of the foregoing ASK discrimination and decision circuit in a receiver device may improve characteristics of the receiver device that may seek low latency and a high Q value. In CPUs including receiver devices, the baud rate may be increased and low latency transmission may be performed by use of the interconnect that utilizes the ASK signal even when there is a constraint in size or the number of pins.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A decision circuit comprising:
a first decision block, coupled to an input terminal, configured to distinguish a value of a first bit of a plurality of bits by using an amplitude of an analog signal from the input terminal as a discrimination point, the analog signal being an amplitude shift keyed signal in which a demodulation pattern of the plurality of bits is set for each one of a plurality of amplitudes;
a superposition block, coupled to the input terminal, configured to acquire a signal of an absolute value of a difference of the analog signal from the input terminal in respect to an amplitude center value of the analog signal from the input terminal by superposing divided analog signals which is obtained by dividing the analog signal from the input terminal;
an inversion block, coupled to an output of the superposition block and an output of the first decision block, configured to control inverting of the signal from the superposition block based on a first distinction result of the first decision block;
a second decision block, coupled to an output of the inversion block, configured to distinguish a value of a second bit of the plurality of bits based on an amplitude of an output signal from the inversion block and the discrimination point; and
an output buffer, coupled to an output of the second decision block and an output of the first decision block, configured to output the first distinction result and a second distinction result of the second decision block in synchronization with a clock.

2. The decision circuit according to claim 1, wherein the analog signal is a four-level signal in which an amplitude is separated into four, and is decoded to a two-bit digital signal.

3. The decision circuit according to claim 1, wherein
the first decision block distinguishes a value of an upper bit as the first bit,
the superposition block converts the analog signal corresponding to a four-level signal to a two-level signal,
the inversion block controls whether or not the inverting is performed on the two-level signal based on the first distinction result,
the second decision block distinguishes a value of a lower bit as the second bit based on the amplitude of the output signal, and
the output buffer outputs the values of the upper bit and the value of the lower bit in synchronization with the clock.

4. The decision circuit according to claim 3, wherein
the inversion block includes:
a signal inversion block configured to output a control signal indicative of a presence or absence of inversion in response to the value of the upper bit; and
an inversion control block configured to control the inverting of the two-level signal based on the control signal.

5. The decision circuit according to claim 1, wherein
the first decision block and the second decision block use at least one of a limiter amplifier and a comparator, and distinguish an upper bit as the first bit by use of the discrimination point set at an amplitude center of the analog signal,
the superposition block superposes the analog signal by use of an AC coupler and a first multiplier, the AC coupler converting the analog signal to a signal having a symmetric level about a ground level in positive and negative sides, the first multiplier multiplying two outputs that are obtained by dividing an output of the AC coupler,
the signal inversion block includes a peak detector that detects a peak value of the upper bit, and a first subtractor that level-shifts the peak value and outputs a level-shifted peak value as the control signal, and
the inversion control signal includes a second multiplier and a second subtractor, a second multiplier multiplying a signal from the first multiplier by the control signal, the second subtractor level-shifting an output of the second multiplier.

6. The decision circuit according to claim 1, wherein
the output buffer is a flip flop.

7. The decision circuit according to claim 5, wherein
the first multiplier and the second multiplier are a four quadrant multiplier.

8. The decision circuit according to claim 1, wherein
an analog process delay based on the first decision block, the superposition block, the inversion block, and the second decision block is equal to or shorter than one cycle of the clock.

9. The decision circuit according to claim 5, wherein
the second subtractor is replaced by a second AC coupler.

10. A receiver device comprising:
a decision circuit configured to perform digital decoding on an analog signal transmitted from a transmitter device via an input terminal, the analog ASK signal being an amplitude shift keyed signal in which a demodulation pattern of a plurality of bits is set for each one of a plurality of amplitudes; wherein
the decision circuit comprises:
a first decision block, coupled to the input terminal, configured to distinguish a value of a first bit of a plurality of bits by using an amplitude of an analog signal from the input terminal as a discrimination point, the analog signal being an amplitude shift keyed signal in which a demodulation pattern of the plurality of bits is set for each one of a plurality of amplitudes;
a superposition block, coupled to the input terminal, configured to acquire a signal of an absolute value of a difference of the analog signal from the input terminal in respect to an amplitude center value of the analog signal from the input terminal by superposing divided analog signals which is obtained by dividing the analog signal from the input terminal;
an inversion block, coupled to an output of the superposition block and an output of the first decision block, configured to control inverting of the signal from the superposition block based on a first distinction result of the first decision block;
a second decision block, coupled to an output of the inversion block, configured to distinguish a value of a second bit of the plurality of bits based on an amplitude of an output signal from the inversion block and the discrimination point; and
an output buffer, coupled to an output of the second decision block and an output of the first decision block, configured to output the first distinction result and a second distinction result of the second decision block in synchronization with a clock.

11. The receiver device according to claim 10, wherein
the analog signal is a four-level signal in which an amplitude is separated into four, and is decoded to a two-bit digital signal.

12. The receiver device according to claim 11, wherein
the first decision block distinguishes a value of an upper bit as the first bit,
the superposition block converts the analog signal corresponding to a four-level signal to a two-level signal,
the inversion block controls whether or not the inverting is performed on the two-level signal based on the first distinction result,
the second decision block distinguishes a value of a lower bit as the second bit based on the amplitude of the output signal, and
the output buffer outputs the values of the upper bit and the value of the lower bit in synchronization with the clock.

13. A processor comprising:
a receiver device configured to receive an analog signal transmitted from a transmitter device; and
a decision circuit,
configured to perform digital decoding on the analog signal input via an input terminal, the analog signal being an amplitude shift keyed signal in which a demodulation pattern of a plurality of bits is set for each one of a plurality of amplitudes,
the decision circuit comprises:
a first decision block, coupled to the input terminal, configured to distinguish a value of a first bit of a plurality of bits by using the amplitude of an analog signal from the input terminal as a discrimination point, the analog signal being an amplitude shift keyed signal in which a demodulation pattern of the plurality of bits is set for each one of a plurality of amplitudes;
a superposition block, coupled to the input terminal, configured to acquire a signal of an absolute value of a difference of the analog signal from the input terminal in respect to an amplitude center value of the analog signal from the input terminal by superposing divided analog signals which is obtained by dividing the analog signal from the input terminal;

an inversion block, coupled to an output of the superposition block and an output of the first decision block, configured to control inverting of the signal from the superposition block based on a first distinction result of the first decision block;

a second decision block, coupled to an output of the inversion block, configured to distinguish a value of a second bit of the plurality of bits based on an amplitude of an output signal from the inversion block and the discrimination point; and an output buffer, coupled to an output of the second decision block and an output of the first decision block, configured to output the first distinction result and a second distinction result of the second decision block in synchronization with a clock, wherein processing is performed on a digital signal that is the ASK signal received and demodulated.

14. The processor according to claim 13, wherein the analog signal is a four-level signal in which an amplitude is separated into four, and is decoded to a two-bit digital signal.

15. The processor according to claim 14, wherein the first decision block distinguishes a value of an upper bit as the first bit, the superposition block converts the analog signal corresponding to a four-level signal to a two-level signal, the inversion block controls whether or not the inverting is performed on the two-level signal based on the first distinction result, the second decision block distinguishes a value of a lower bit as the second bit based on the amplitude of the output signal, and the output buffer outputs the values of the upper bit and the value of the lower bit in synchronization with the clock.

\* \* \* \* \*